United States Patent Office 2,880,206
Patented Mar. 31, 1959

2,880,206

MECURATED BIURET DERIVATIVES

Lincoln Harvey Werner, Summit, N.J., assignor to Ciba Pharmaceutical Products, Inc., Summit, N.J., a corporation of New Jersey No Drawing. Application March 29, 1955
Serial No. 497,792

11 Claims. (Cl. 260—242)

This invention relates to mercurated biuret derivatives and their manufacture. More particularly the invention relates to allyl biuret compounds having the structural formula:

and salts thereof, wherein R and $R_1$ represent hydrogen or lower alkyl, e. g. methyl, ethyl and the like. As salts, there are contemplated especially those with inorganic acids or organic carboxylic acids, for example hydrohalic acids, such as hydrochloric or hydrobromic acid, nitric acid, sulfuric acid, phosphoric acids, aliphatic carboxylic acids such as lower fatty acids, e.g. acetic or propionic acid, oxalic acid, tartaric acid, citric acid, guanidino-acetic or glutamic acid, aromatic carboxylic acids, e.g. benzoic or salicylic acid and the like, or theophylline.

The invention is especially concerned with 1-3-hydroxymercuri-2-methoxy-propyl)-biuret and its salts.

The compounds of the invention in general are prepared by reacting the appropriate mercuric salt such as mercuric chloride, mercuric acetate and the like, or mercuric oxide in the presence of the appropriate acid, with an allyl biuret of the formula:

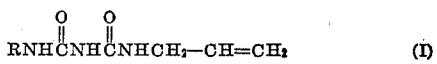

wherein R has the aforesaid meaning. The mercuration reaction is carried out in water or lower alkanols, e.g. methanol or ethanol, or mixtures of the two. The mercuration may be carried out at room temperature or at elevated temperatures, such as those produced by a steam bath. If necessary, alkali is added to the reaction mixture to bind strong acids set free during the reaction. Depending on the nature of the solvent used, compounds are obtained which carry in 2-position a free hydroxy group or a hydroxy group etherified with a lower alkanol.

Depending on the working conditions, the new compounds are obtained in the form of the free hydroxy-bases or salts thereof. From the salts the hydroxy compounds can be obtained, for example by treatment with alkali. The free bases can be converted into their therapeutically useful or non-toxic salts by reaction with the appropriate acids. Furthermore, salts obtained may be converted into other salts by double decomposition. Thus, an acetate may be converted into a bromide by reaction with sodium bromide.

The allyl biurets used as starting materials are in general prepared by heating a nitro biuret with allyl amine in aqueous solution according to the procedure:

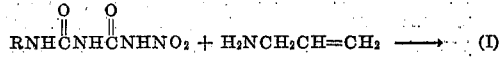

Alternatively allyl biurets are prepared by heating allyl amine with an allophanic alkyl ester, e.g. allophanic methyl ester, according to the procedure:

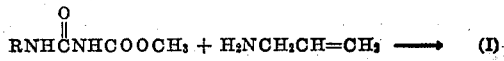

Wherein R has the meanings as aforesaid.

The compounds of the invention are potent diuretics. They are active when given parenterally and are of especial interest by virtue of a strong diuretic activity when administered orally. 1-(3-hydroxymercuri-2-methoxy-propyl)-biuret shows outstanding activity when administered orally.

For therapeutic use the new compounds may be made up into pharmaceutical compositions together with a pharmaceutical carrier. These compositions may be in any suitable solid or liquid dosage form, especially in a form suitable for oral or parenteral administration, e.g. tablets, capsules, pills or solutions, e.g. in the form of ampouled injectable solutions. As pharmaceutical carriers, there may be employed materials or mixtures of such which do not react with the new compounds and are therapeutically useful. Substances or mixtures thereof, such as water, gelatine, lactose, starch, magnesium stearate, talc, vegetable oils, benzyl alcohol, ascorbic acid, gums, glycols such as propylene glycol or polyalkylene glycol, petroleum jelly, cholestero, tragacanth, alcohol or others may be employed. In preparing the novel compositions, the new compounds are admixed with the pharmaceutical carrier and formulated in the desired dosage unit form according to pharmaceutical practice. The compositions may be sterilized and may contain auxiliary substances, such as preservatives, stabilizing, wetting or emulsifying substances, salts for the control of the osmotic pressure or buffer substances or other therapeutically active substances.

This application is a continuation-in-part application of my copending application, Serial No. 426,579, filed April 29, 1954, now abandoned.

The invention is illustrated in greater detail in the examples which follow. It is to be understood that these examples are presented by way of illustration and not of limitation. Temperatures are uncorrected and are expressed in degree of centigrade. Parts by weight bear the same relation to parts by volume as do grams to milliliters.

*Example 1*

50 parts by weight of nitro biuret, 21 parts by weight of allyl amine and 150 parts by volume of water are mixed and heated gently on a steam bath so that the evolution of nitrous oxide does not become too vigorous. When the evolution of gas slows down, the temperature of the reaction mixture is gradually raised until the evolution of gas ceases. The total heating time is about 4½ hours. The solution is then concentrated, filtered and the residue recrystallized from water to yield 1-allyl-biuret, M.P. 140–143°.

5.6 parts by weight of 1-allyl-biuret in 35 parts by volume of methanol and 12.24 parts by weight of mercuric acetate in 180 parts by volume of methanol are mixed and heated on the steam bath for ½ hour. After standing at room temperature for 1 hour, the mixture, containing the acetate of 1-(3-hydroxymercuri-2-methoxy-propyl)-biuret, is filtered. 78 parts by volume of 1 N methanolic sodium hydroxide are added to the filtrate and the white solid which precipitates is filtered off. The solid residue thus obtained is reprecipitated by dissolving in 1.9 parts by volume of acetic acid and 50 parts by volume of methanol followed by the addition of 34 parts by volume of 1 N methanolic sodium hydroxide. The mixture is then filtrated to yield 1-(3-hydroxymercuri-2-methoxy-propyl)-biuret; M.P. 165–170° (dec.) and having the formula:

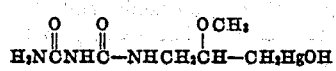

Example 2

A solution of 1.43 parts by weight of 1-allyl-biuret dissolved in 30 parts by volume of methanol and a solution of 3.18 parts by weight of mercuric acetate dissolved in 60 parts by volume of methanol are combined and heated for 15 minutes on a steam bath. The mixture is filtered and evaporated to dryness. The residue is dissolved in a small amount of water to which a saturated solution containing 0.58 part by weight of sodium chloride is added. An oily precipitate is deposited which solidifies on trituration. The product, the chloride of 1-(3-hydroxymercuri-2-methoxy-propyl)-biuret, is filtered off, washed with water, dried and recrystallized from methanol; M.P. 170–173°. It has the formula:

By substituting a saturated solution containing an equivalent quantity of sodium bromide for the sodium chloride, the bromide of 1-(3-hydroxymercuri-2-methoxy-propyl)-biuret is obtained.

Example 3

12.8 parts by weight of N-ethyl-allophanic acid methyl ester, 17 parts by volume of allyl amine and 33 parts by volume of water are mixed, sealed in a reaction tube and heated at 100° for 2 hours. After cooling, the solution is removed, evaporated to dryness and extracted three times with ethyl acetate. The ethyl acetate extract is dried over sodium sulfate, filtered and the filtrate concentrated and chilled. The crystalline product which separates is recrystallized from water to yield 1-allyl-5-ethyl-biuret melting at 77–80°.

1.93 parts by weight of 1-allyl-5-ethyl-biuret dissolved in 50 parts by volume of methanol are added to a solution of 4.2 parts by weight of mercuric acetate in 50 parts by volume of methanol. The mixture is heated on the steam bath for ½ hour after which it is allowed to stand at room temperature for an additional ½ hour. The mixture is then filtered and evaporated to dryness in vacuo whereupon the acetate of 1-(3-hydroxymercuri-2-methoxy-propyl)-5-ethyl-biuret is obtained as a water soluble syrup having the formula:

Example 4

A solution of 15 parts by volume of allyl amine dissolved in 15 parts by volume of water is added to 6.4 parts by weight of methyl allophanic acid methyl ester and the mixture heated at 100° for three hours in a sealed reaction tube. After cooling to room temperature, the solution is concentrated and allowed to stand. The crystals which separate are recrystallized from water to yield 1-allyl-5-methyl-biuret; M.P. 107–109°.

A solution of 1 part by weight of 1-allyl-5-methyl-biuret in 10 parts by volume of methanol is added to a solution of 2.02 parts by weight of mercuric acetate dissolved in 25 parts by volume of methanol. The mixture is heated for ½ hour on the steam bath after which it is permitted to stand at room temperature for 1 hour. The reaction mixture is filtered and concentrated to dryness to yield the acetate of 1-(3-hydroxymercuri-2-methoxy-propyl)-5-methyl-biuret as a water soluble syrup having the formula:

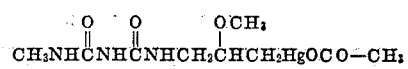

Example 5

1.96 parts by weight of 1-(3-hydroxymercuri-2-methoxy-propyl)-biuret is added to a solution of 0.91 part by weight theophylline in 125 parts by volume of methanol. To facilitate solution, an additional 60 parts by volume methanol are added. The solution is then filtered, and the filtrate evaporated to dryness. Acetone is added and the powdery product filtered off; M.P. 140–160° (dec.). The theophylline-salt of 1-(3-hydroxymercuri-2-methoxy-propyl)-biuret has the formula:

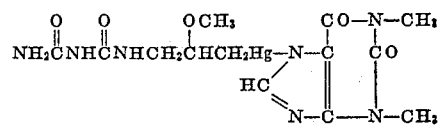

Example 6

A solution of 6.0 parts by weight mercuric acetate in 20 parts by volume water and 0.1 part by volume of acetic acid is added to 2.86 parts by weight 1-allyl-biuret dissolved in 30 parts by volume water, the reaction mixture warmed on the steambath for 30 minutes and then allowed to stand at room temperature for 3 hours. The solution is filtered and made alkaline by adding 2-normal potassium carbonate. A precipitate forms which is washed with water and methanol, filtered off and dried. The product is dissolved in 60 parts by volume of methanol and 5.0 parts by volume acetic acid, the solution filtered, neutralized with methanolic normal sodium hydroxide and the precipitate which forms is filtered off, washed with methanol and dried in vacuo. The product, 1-(3-hydroxymercuri-2-hydroxy-propyl)-biuret, melts with decomposition at 160° and corresponds to the formula:

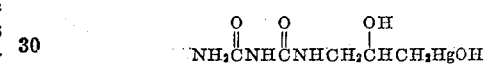

Example 7

3.92 g. 1-(3-hydroxymercuri-2-methoxy-propyl)-biuret are suspended in 20 ml. methanol and 5 ml. 2 N nitric acid are added. The resulting clear solution is evaporated to dryness. The residue is triturated with acetone and ether and dried in vacuo. Thus, the nitrate of 1 - (3 - hydroxymercuri - 2 - methoxy - propyl) - biuret of the formula:

is obtained. It is soluble in water and melts with foaming at 129°.

Example 8

4.3 g. 1-allylbiuret are dissolved in 60 ml. methanol at 50° and 6.5 g. mercuric oxide are added. With agitation 15 ml. 2 N nitric acid are added dropwise. After 10 minutes almost all mercuric oxide dissolves. The solution is filtered and allowed to stand at room temperature. After several hours the nitrate of 1-(3-hydroxymercuri-2-methoxy-propyl)-biuret begins to crystallize. After standing for one to two days, the product is filtered off, washed with methanol and dried. It is water soluble and melts with foaming at 129°.

Instead of isolating the mercurated allylbiuret as the nitrate, the aqueous methanol solution can be treated with methanolic sodium hydroxide to yield the 1-(3-hydroxymercuri - 2 - methoxy) - biuret as described in Example 1.

Example 9

3.92 g. 1-3-hydroxymercuri-2-methoxy-propyl)-biuret is suspended in 20 ml. methanol and 10 ml. sulfuric acid is added. The hydroxymercuri compound dissolves to form the sulfate. The solution is evaporated to dryness and the residue triturated with alcohol and acetone. The product, the sulfate of 1-(3-hydroxymercuri-2-methoxy-propyl)-biuret of the formula:

is filtered off and dried in vacuo. It is soluble in water and melts with foaming at 97°.

Example 10

1.95 g. 1-(3-hydroxymercuri-2-methoxy-propyl)-biuret, 0.73 g. glutamic acid and 65 ml. water are mixed and stirred. The resulting clear solution is evaporated to dryness. The residue is triturated with acetone and ether and dried in vacuo. The thus obtained glutamate of 1 - (3 - hydroxy - mercuri - 2 - methoxy - propyl)-biuret melts at 110–120°.

Example 11

3.92 g. 1-(3-hydroxymercuri-2-methoxy-propyl)-biuret, 1.22 g. benzoic acid and 20 ml. methanol are combined. On standing and stirring, a clear solution is obtained, which is evaporated to dryness. The solid residue is triturated with ether and filtered off. The benzoate of 1-(3-hydroxymercuri-2-methoxy-propyl)-biuret forms a white powder which is only slightly soluble in water and melts with foaming at 75°. It has the formula:

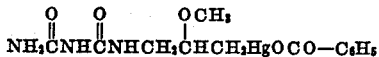

Example 12

3.92 g. 1-(3-hydroxymercuri-2-methoxy-propyl)-biuret, 1.38 g. salicylic acid and 20 ml. methanol are combined. On stirring a clear solution results which is evaporated to dryness and the residue triturated with ether and filtered off and dried in vacuo. The thus obtained salicylate of 1 - (3 - hydroxymercuri - 2 - methoxy-propyl)-biuret is slightly soluble in water and melts with foaming at 130°. It has the formula:

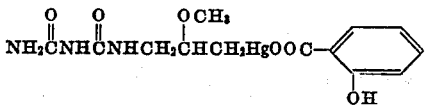

Example 13

1-(3-hydroxymercuri-2-methoxy-propyl)-biuret can be made up into pharmaceutical preparations, for example of the following composition:

|  | G. |
|---|---|
| 1-(3-hydroxymercuri-2-methoxy-propyl)-biuret | 39.43 |
| Tragacanth BC | 4.00 |
| Lactose | 140.57 |
| Corn starch | 10.00 |
| Talcum | 5.00 |
| Magnesium stearate | 1.00 |
|  | 200.00 |

For this purpose, the lactose, tragacanth and mercuri compound are screened using a No. 10 screen and mixed. The mixture is granulated with 50 percent 3A alcohol, passed through a square hole screen and dried at room temperature. After passing through a No. 3 screen, the mixture is used for compressing 200 mg. tablets.

What is claimed is:

1. Compounds of the group consisting of organic mercury compounds of the formula:

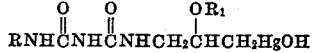

wherein R and $R_1$ represent members selected from the group consisting of hydrogen and lower alkyl, and therapeutically useful salts of the mercury base with an acid.

2. 1-(3-hydroxymercuri-2-methoxy-propyl)-biuret.
3. The acetate of 1-(3-hydroxymercuri-2-methoxy-propyl)-biuret.
4. The chloride of 1-(3-hydroxymercuri-2-methoxy-propyl)-biuret.
5. The bromide of 1-(3-hydroxymercuri-2-methoxy-propyl)-biuret.
6. 1 - (3 - hydroxymercuri - 2 - methoxy - propyl) - 5-ethyl-biuret.
7. The acetate of 1-(3-hydroxymercuri-2-methoxy-propyl)-5-ethyl-biuret.
8. 1 - (3 - hydroxymercuri - 2 - methoxy - propyl) - 5-methyl-biuret.
9. The acetate of 1-(3-hydroxymercuri-2-methoxy-propyl)-5-methyl-biuret.
10. 1 - (3 - hydroxymercuri - 2 - hydroxy - propyl)-biuret.
11. The theophylline salt of 1-(3-hydroxymercuri-2-methoxy-propyl)-biuret.

References Cited in the file of this patent

UNITED STATES PATENTS

| 2,145,392 | Harmon | Jan. 31, 1939 |
| 2,281,559 | D'Alelio | May 5, 1942 |
| 2,378,110 | Simons et al. | June 12, 1945 |
| 2,576,349 | Lehman | Nov. 27, 1951 |
| 2,675,388 | Lehman | Apr. 13, 1954 |

FOREIGN PATENTS

| 974,085 | France | Sept. 27, 1950 |
| 4,250 | Great Britain | Aug. 22, 1907 |
| 165,779 | Great Britain | Apr. 13, 1922 |

OTHER REFERENCES

Jour. Org. Chem., vol. 15, pages 1055–1059 (1950).
Rowland et al.: J. A. C. S., 72, 3595–97 (August 1950).
Rowland et al.: J. A. C. S., 73, 3691–3693 (January 1951).

UNITED STATES PATENT OFFICE

Certificate of Correction

Patent No. 2,880,206                      March 31, 1959

Lincoln Harvey Werner

It is hereby certified that error appears in the printed specification of the above numbered patent requiring correction and that the said Letters Patent should read as corrected below.

Column 1, lines 30 and 31, for "1-3-hydroxymercuri-" read —1-(3-hydroxymercuri-—; same column, last line, for "Wherein R has the meanings" read —wherein R has the meanings—; column 2, line 20, for "cholestero" read —cholesterol—; column 4, line 64, for "1-3-hydroxymercuri-" read —1-(3-hydroxymercuri-—; same column 4, Example 9, the formula should read as shown below instead of as in the patent:

Signed and sealed this 28th day of July 1959.

[SEAL]

Attest:
KARL H. AXLINE,
Attesting Officer.

ROBERT C. WATSON,
Commissioner of Patents.